Patented May 24, 1932

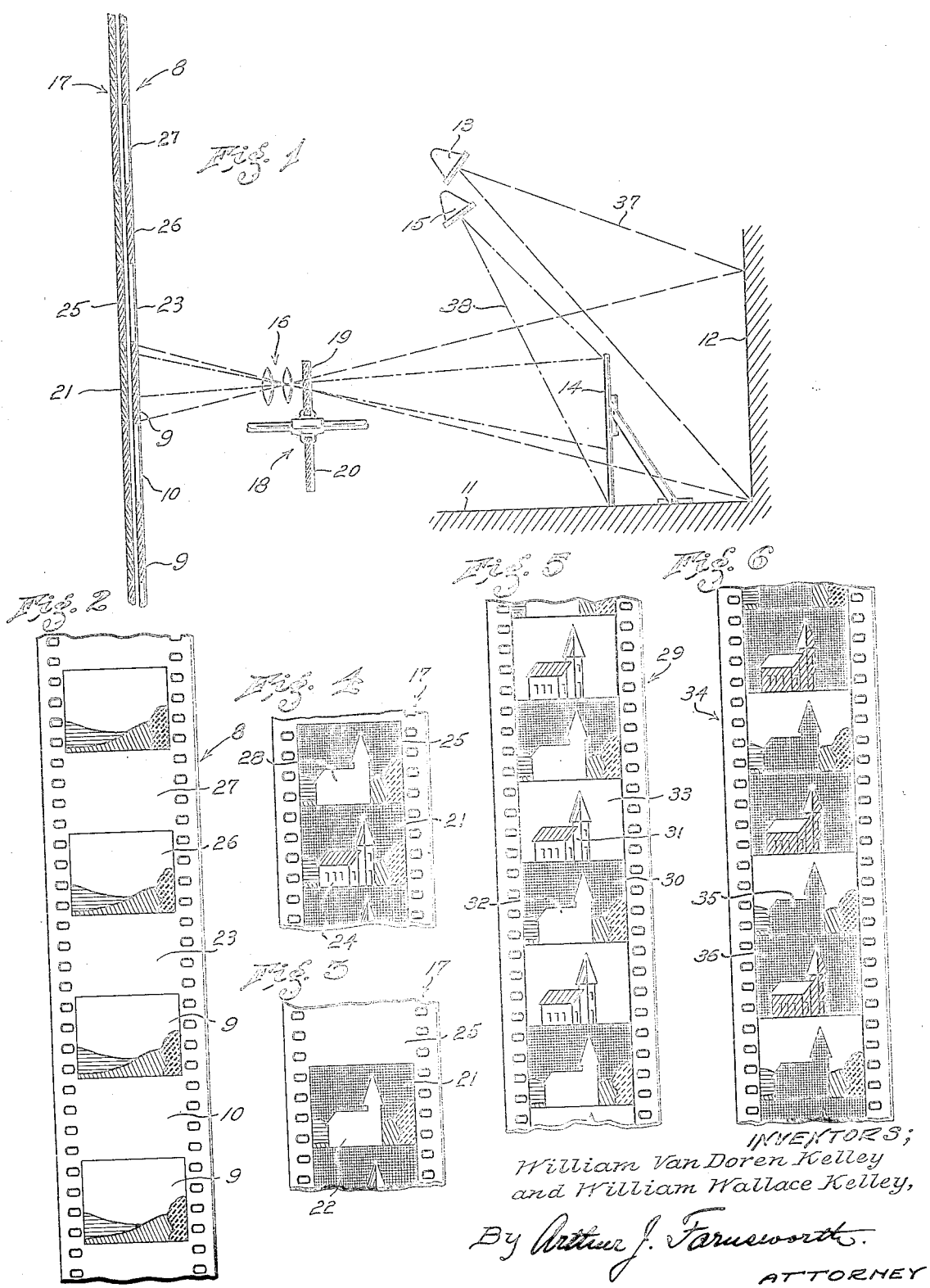

1,859,589

UNITED STATES PATENT OFFICE

WILLIAM VAN DOREN KELLEY AND WILLIAM WALLACE KELLEY, OF LOS ANGELES, CALIFORNIA

METHOD OF PRODUCING COMPOSITE PHOTOGRAPHS

Application filed March 1, 1928. Serial No. 258,299.

In this specification, and the accompanying drawings, we will describe and show a preferred form of our invention, and specifically mention certain of its more important objects. We do not limit ourselves to the forms disclosed, since various changes and adaptations may be made therein without departing from the essence of our invention as hereinafter claimed; and objects and advantages, other than those specifically mentioned, are included within its scope.

This invention relates to composite photography, and it is particularly adapted for the production of composite motion pictures. Its principal purpose is to provide means whereby action and objects may be combined with a previously photographed film, to produce a result that appears in every way to be an original photographic reproduction of the whole. As an example of its application, a scene may be made, say in Paris, and afterwards an action or objects may be inserted in that scene in another country, without any appearance of "faking." Or, a single actor may represent two characters, and actually be photographed at different times, and then the two results may be combined in such a way that both characters appear upon the same scene with every appearance of having been photographed synchronously.

The purposes of the invention are accomplished in the manner illustrated in the accompanying drawings, in which—

Figure 1 shows the essential elements and arrangement of the apparatus that is required for our process, the figure being diagrammatic, partly in cross section, and greatly distorted as to scale, for convenience of illustration;

Figure 2 shows, in elevation, a fragment of positive motion picture film, prepared from the negative of an original scene as the first step of our process;

Figure 3 is an elevation of a fragment of a negative motion picture film, illustrating an intermediate step for producing the composite negative;

Figure 4 is a similar fragmentary view, illustrating the last step of the process;

Figure 5 is an elevation of a fragment of an intermediate negative film, produced by our process in a slightly different manner than that of the other films illustrated;

Figure 6 is a similar fragmentary view of an intermediate positive film, printed from the negative shown in Figure 5 and used by us in the last mentioned manner of utilizing our invention;

Similar reference numerals refer to similar parts throughout the several views.

Passing to a description of our process in detail, we may assume, as an example of its application, that a motion picture negative has been made of a certain scene, and that it is desired to reproduce this with certain objects, action, or figures, inserted therein. The first step in the process is to make, from the original negative, a positive film 8 of twice the length, by skipping each alternate picture area in the printing. When completed, the positive film will consist of a series of picture areas 9, spaced by clear or transparent areas 10, as shown in Figure 2. This positive film may be conveniently referred to as the "background picture." The skip-printing necessary for its production may be accomplished in ways that are well known to those familiar with this general art, and it need not be described herein, since it forms no part of our present invention.

The photographing of the action or objects that it is desired to insert in the original scene, is usually accomplished on a stage 11, the apparatus being arranged in the general manner indicated in Figure 1. The background 12 is of blue, and is illuminated by a beam of blue light from a spotlamp 13, so as to reflect as pure a color as possible. The figures or objects to be doubled into the picture are set or suspended in front of the background at 14, and are strongly illuminated by pure color red light from spotlamp 15. The effect desired is to have a color upon everything back of the objects to be doubled that is complemental to the color upon these objects themselves.

The photographing of a composite negative may be accomplished in the manner next to be described, by means of a special motion picture camera (not shown) that is equipped set screw $f$, as shown... or passage through a weight so... of varying diameter, being smallest in that part where the set screw is located, which is preferably the longitudinal middle, and flaring thence toward either end, in order to limit the length of contact with the string to the minimum. Other means of mounting the weight may however be employed and I therefore do not limit my protection to this detail.

By selecting weights of proper specific likewise in the sa... on the string $b^3$ two weights, one placed close to one of the bridges, but without touching it, while the second weight is at some distance from the other bridge, this arrangement bringing out the octaves; in other words causing the spring to vibrate in halves, fourths, eights, etc. These illustracases. It affords an opportunity, for instance, 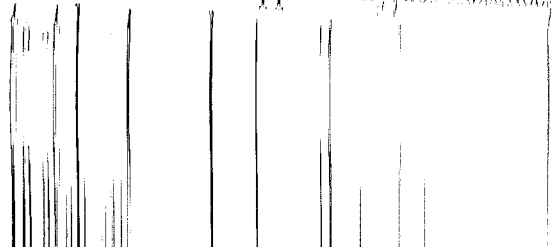 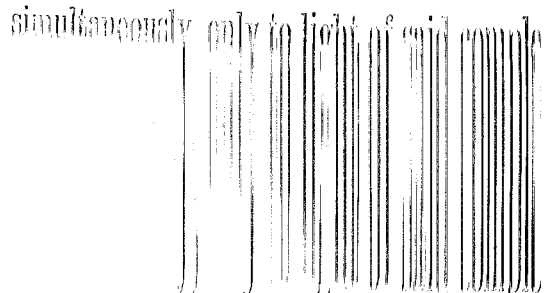 simultaneously only to light of said elemental color coming from said objects.

to check out any phantoms that might possibly appear in areas 32 or 33 of film 29; or to accomplish an equivalent result by coloring the black areas 35 and 36 of film 34.

Other methods for utilizing our process will occur to those who are familiar with this art. For instance the background 12 may be properly colored and illuminated so that its reflected light can pass both of the filter screens of the camera. In that case a negative similar to that shown in Figure 5 can be produced in the manner last described, but the backgrounds 33 of the figure frames will be exposed instead of being clear. Such a negative may be found to be of direct use in certain cases, and may eliminate the necessity for producing the positive film of Figure 6.

From the above description it will be evident that our process is adapted to variations in the details of procedure, without departing from its essence, and such variations are contemplated by us. For instance, use may be made of prisms and twin lenses to effect both camera exposures at the same time.

We desire particularly to call attention to the fact that, although we have for convenience shown and described an inanimate object at 14, the process is perfectly applicable to the doubling of moving figures into a previously taken scene, by having such figures act upon stage 11, and take the place of object 14.

We also desire to point out that the photographing is done wholly by reflected light from background 12 and object 14. The spot-lamps 13 and 15 may be very easily positioned so that their beams do not overlap or in any way interfere. Thus a cone 37 of blue light from spot-lamp 13 may be caused to illumine background 12, without impinging upon anything else that is visible from the camera. Similarly a cone 38 of red light from spot-lamp 15 may be made to illumine object 14 without impinging upon the background, or anything else within the field of the camera lenses.

Having thus fully described the principles and operation of our invention in a simple manner and shown ways in which it may be utilized, we claim:

1. The method of producing composite photographs which comprises; producing an uncolored positive film having picture areas spaced by clear areas; exposing a frame of a bi-chromatic sensitized film through a color filter and a corresponding picture area of said positive, only to actinic light of one elemental color coming from a plain unfigured background and partially intercepted by opaque objects in front of said background; and immediately after each of said respective exposures exposing through a filter of a complemental color the unexposed portions of said frames, through clear areas of the positive, only to actinic light of said complemental color coming from said objects.

2. The method of producing composite cinema films which comprises; making a double-length positive background film having picture areas spaced by clear areas; exposing through a filter color in turn each frame of sensitized film, through a corresponding picture area of said positive, only to actinic light coming from a plain unfigured background and partially intercepted by opaque objects in front of said background; and immediately after each of said respective exposures exposing through a filter of a complemental color the unexposed portions of said frames, through clear areas of the positive, only to actinic light coming from said objects; and shifting the positive film with twice the frequency of the sensitized film.

3. The method of producing composite cinema films which comprises; making a double-length positive background film having picture areas spaced by clear areas; exposing in turn each frame of a bi-chromatic sensitized film, through a color filter and a corresponding picture area of said positive, only to actinic light of one elemental color coming from a plain unfigured background and partially intercepted by opaque objects in front of said background; and immediately after each of said respective exposures, exposing the unexposed portions of said frames, through a complemental color filter and clear areas of the positive, only to actinic light of a correspondingly complemental elementary color coming from said objects; and shifting the positive film with twice the frequency of the sensitized film.

4. The method of producing composite cinema films which comprises; making a double-length positive background film having picture areas spaced by clear areas; exposing through a color filter in turn each alternate frame of a double-length sensitized film through a corresponding picture area of said positive, only to actinic light of said color coming from a plain unfigured background and partially intercepted by opaque objects in front of said background; intermediately exposing through a filter of complemental color in turn the intermediate frames of the sensitized film, through clear areas of the positive, only to actinic light of said complemental color coming from said objects; making an intermediate negative from said thus exposed sensitized film; making an inframes be...
coming from said o...

7. The method of produc...
cinema films which comprises; making a dou-
ble-length positive background film having
picture areas spaced by clear areas; expos-
ing each alternate frame of a double-length
bi-chromatic sensitized film through a corre-
sponding picture area of said positive, only to
actinic light of one elemental color coming
from a plain unfigured background and par-
tially intercepted by opaque objects in front
of said background; exposing the interme-
diate frames of the sensitized film, through
clear areas of the positive, only to actinic
light of a correspondingly complemental ele-
mentary color coming from said objects;

positive film having picture areas and ...
areas; exposing a sensitized film through a
picture area of said positive, only to light
coming from a uniform unfigured back-